Aug. 18, 1970

L. KNIEL 3,524,897

LNG REFRIGERANT FOR FRACTIONATOR OVERHEAD

Original Filed Oct. 14, 1963

INVENTOR
LUDWIG KNIEL

BY Ross L. Foertmeyer

ATTORNEY

United States Patent Office 3,524,897
Patented Aug. 18, 1970

3,524,897
LNG REFRIGERANT FOR FRACTIONATOR OVERHEAD
Ludwig Kniel, Scarsdale, N.Y., assignor to The Lummus Company, New York, N.Y., a corporation of Delaware
Continuation of application Ser. No. 316,048, Oct. 14, 1963. This application Oct. 17, 1968, Ser. No. 779,292
Int. Cl. F25j 3/08; C07c 7/04
U.S. Cl. 260—683                                4 Claims

ABSTRACT OF THE DISCLOSURE

A process for producing ethylene and regasifying a natural gas to recover the cold potential thereof wherein the caloric potential recovered by regasifying and superheating the natural gas is employed to meet the refrigeration requirements for both a demethanizer in the regasification plant and the separation and purification zones in the ethylene plant, with the bottoms recovered from the demethanizer being employed as feed to the ethylene plant.

---

Figure 1:
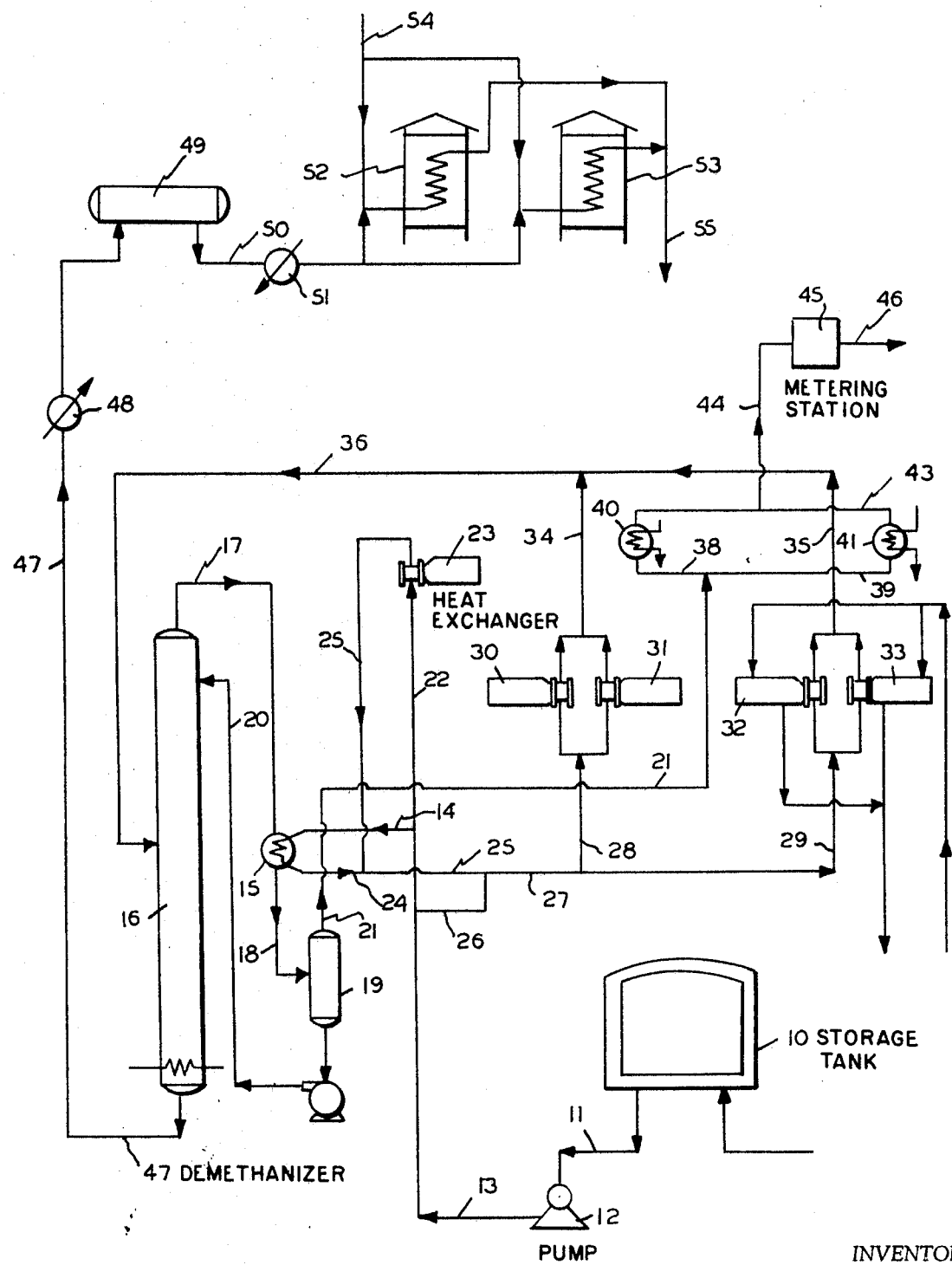

This application is a continuation of my application Ser. No. 316,048, filed Oct. 14, 1963.

The present invention relates to a method of recuperating for useful purposes the caloric potential of liquefied natural gas during regasification. More particularly, the present invention relates to a method of recovering such caloric potential in the operation of a regasification station at a receiving terminal where liquefied natural gas is received by bulk transport and where the liquefied natural gas is continuously vaporized into a pipe line distribution system, such as would be operated by a public utility.

Consider, for example, an ocean transport route where natural gas is liquefied at one end of the route, transshipped to the receiving terminal and there vaporized into a gas distribution system. From economic considerations, the minimum liquid natural gas volume on which an operation of this sort for distances in the order of 3000 nautical miles would yield a commensurate profit would be on the order of 40 million standard cubic feet per day (14,000 barrels of liquid volume at —257° F). Each tank ship may carry 170,000 barrels or more, a minimum storage of 200,000 barrels or more would be necessary at each end terminal.

Out of storage, the liquefied natural gas will normally be regasified in accordance with momentary demands. There will be daily peak loads and seasonal peak demands, such as experienced in the natural gas distribution systems supplying gas for home and industrial use. The seasonal peaks may be regulated by a change in the frequency of shipments while daily demand peaks may be regulated by changing the send out rate. Regasification will normally be carried out under pressure, for example, between about 150 to 300 p.s.i.g. and more. The natural gas may also be reformed under pressure to match the heating value of gas from other sources with which the natural gas is to be mixed.

Consider such an operation for an average daily delivery of 65 million cubic feet of liquefied gas. The caloric potential or refrigeration value of 65 million cubic feet of liquefied natural gas at a temperature of from —257° F. which is regasified to a temperature of approximately 60° F., is equal to 39.8 million B.t.u.'s per hour. Taking into account the temperature at which refrigeration is available, it would require about 13,700 B.H.P. of compressor capacity to produce an equivalent amount of refrigeration. The present invention proposes to put to use this caloric potential or refrigeration value insofar as possible.

In accordance with the present invention, methane is separated from ethane and heavier constituents during regasification of the liquefied natural gas. The ethane and heavier constituents are converted into ethylene, and other valuable products. The caloric potential or refrigeration value during revaporization of the liquefied natural gas provides the refrigeration duty for the separation of the ethane and heavier constituents from the methane contained in the liquefied natural gas, and for the separation and purification of the ethylene. The plant capacity of the ethylene plant will be determined by the average daily base demand for natural gas.

Assuming a gas containing 87 vol. percent methane, 11 vol. percent ethane and 2 vol. percent propane, the following amounts of refrigeration can be obtained from 65 million cubic feet per day of liquefied natural gas at the indicated temperature levels if the revaporization pressure is 330 p.s.i.a. and the delivery line temperature is 60° F.:

TABLE 1

(A) reheating from —156° F to —152° F.=12.0 million B.t.u./hr.
(B) vaporizing at —152° F. to —149° F.=14.20 million B.t.u./hr.
(C) superheating from —149° F. to 60° F.=13.6 million B.t.u./hr.
    Total from —256° F. to 60° F.=39.8 million B.t.u./hr.

If the liquefied natural gas could be vaporized at a constant rate, the caloric potential of (B) and (C), plus about 2.5 million B.t.u./hr. of the caloric potential of (A) would satisfy the refrigeration requirements for an ethylene plant producing approximately 400 million pounds of ethylene from ethane, or 320 million pounds per year of ethylene from naphtha or propane.

The above caloric potential would be available if the indicated volume were vaporized at a constant rate. However, on account of the fluctuations in the course of a day, as well as of seasonal fluctuations in the send out rate for gas it would not be practical to utilize the entire refrigeration capacity in an industrial plant such as an ethylene plant that must be operated at a relatively uniform rate. It is thus contemplated, to utilize that part of the refrigeration potential resulting from the minimum daily gas delivery volume and to design the ethylene plant accordingly while at the same time providing for some overcapacity for the seasonal adjustment to some higher daily minimum or "base" gas volume, as for instance during the winter season when the demand for gas is greater.

Dry gases from condensate producing wells and off-gases from absorption plants not specifically operated for the recovery of ethane frequently contain this amount and more of ethane. Leaner gases that may be available for liquefaction may be enriched with ethane under particular circumstances as for instance by a method illustrated in a copending application of the inventor.

As under the scope of this invention, the LNG regasification facilities are to be coupled with an ethylene plant for the utilization of the cold potential: the recovery of as much ethane and propane as possible from the transshipped LNG is an important factor in the practice of this invention.

As an example, from 65 million cubic feet of LNG of the above composition the following quantities of methane, ethane, and propane will be available:

TABLE 2

| Comp. | Million cu. ft./day | Million cu. ft./hr. | Lbs./hr. |
|---|---|---|---|
| $C_1$ | 56.55 | 2.355 | 99,500 |
| $C_2$ | 7.15 | .298 | 23,600 |
| $C_3$ | 1.30 | .054 | 6,280 |
| Total | 65.00 | 2.707 | 129,480 |

It is planned, as further described below, to separate the ethane and heavier from the methane over a demethanizer. If only 90% of the available ethane and 100% of the available propane were recovered over this demethanizer, the volumes of ethane and propane recovered as charge stock to the ethylene plant would have the following values:

TABLE 3

| Comp. | Lbs./hr. | Percent recovery | Lbs./hr. recovered |
|---|---|---|---|
| $C_2$ | 23,600 | 90 | 21,240 |
| $C_3$ | 6,280 | 100 | 6,280 |
| Total | 29,880 | | 27,520 |

From these charge stocks there would be produced the following amounts of ethylene:

TABLE 4

| Comp. | Lbs./hr. charged | Furnace yield, wt. percent | Lbs./hr. of ethylene produced | Percent recovery | Lbs./hr. of ethylene delivered |
|---|---|---|---|---|---|
| $C_2$ | 21,240 | .78 | 16,710 | .97 | 16,240 |
| $C_3$ | 6,280 | .45 | 2,830 | .98 | 2,770 |
| Total | 27,520 | | 19,570 | | 19,010 |

The percent recovery in the above tabulation refers to the recovery of ethylene from the furnace effluent stream over the purification section of the ethylene plant and, in the case of ethane, allows also for any loss of ethane from the ethane recycle stream.

There would thus be produced in 350 operating days per calendar year by the ethylene plant a total of 160 million lbs. of ethylene. It will be shown below that the refrigeration requirements of an ethylene plant of this capacity are far below the available refrigeration potential as tabulated above when revaporizing LNG at a uniform rate and that they are even well below that available when revaporizing at any reasonable daily minimum rate.

An advantage of the present invention is that the ethylene plant could be a relatively low pressure plant in view of the caloric potential available, thereby resulting in a savings in construction costs. Additionally, the ethylene plant would not require refrigeration compressors providing a savings in plant utilities requirements in addition to a lower initial investment.

It is an object of the present invention, therefore, to recover ethylene-producing constituents from liquefied natural gas during regasification of the liquefied natural gas.

It is another object of the present invention to utilize the caloric potential of regasification of the liquefied natural gas to effect the separation of the ethylene-producing constituents from the liquefied natural gas.

Another object of the present invention is to utilize the caloric potential of regasification of the liquefied natural gas to effect the separation and purification of ethylene after conversion of such ethylene-producing constituents.

Other objects of the present invention will become apparent from the following description taken in conjunction with the accompanying drawings wherein like numeral designate like equipment.

Figure 2:
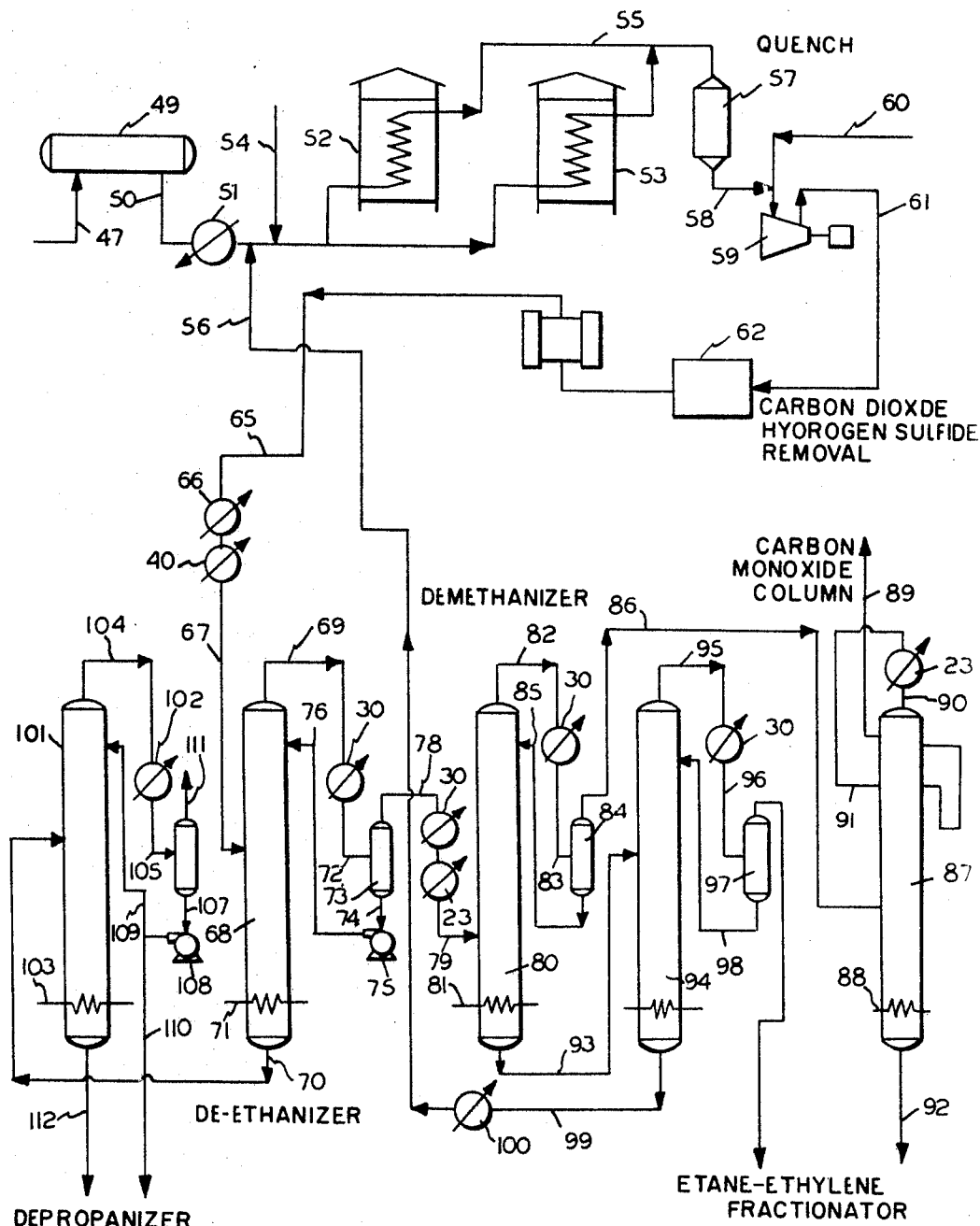

FIG. 1 is a schematic flow diagram illustrating a preferred embodiment of my invention for the regasification of liquefied natural gas, and FIG. 2 is a schematic flow diagram illustrating one embodiment of an ethylene process system.

Referring to FIG. 1, liquefied natural gas from a transport carrier is stored in a storage tank 10, constructed in the usual manner. The liquefied natural gas is stored at approximately atmospheric pressure and at a temperature of —257° F., for eventual use in the natural gas distribution system, as required.

The liquefied natural gas (hereinafter referred to as "LNG") is withdrawn from the storage tank 10 through line 11 and passed by a pump 12 into line 13 at a rate corresponding to the momentary demand of a gas distribution system operating under a pressure determined by the delivery pressure of the system. The pressure of the LNG is raised by pump 12 to a pressure sufficient to overcome the head loss through the revaporization equipment, a pressure in the order of about 350 p.s.i.a., assuming a gas distribution pressure of about 300 p.s.i.a. A portion of the LNG in line 13 is passed through line 14 into reflux condenser 15 of demethanizer tower 16 to provide the cooling requirements for the reflux condenser 15. During passage of the LNG through reflux condenser 15, the LNG is heated to approximately —170° F. As more fully hereinafter described, demethanizer tower 16 functions to separate ethane and heavier constituents formed in the LNG after vaporization of the LNG. The overhead in line 17 from demethanizer 16 is cooled in reflux condenser 15 and passed through line 18 to a separator 19. The reflux requirements for demethanizer 16 are withdrawn from separator 19 through line 20 and introduced into the upper portion of demethanizer 16. Essentially methane is withdrawn from separator 19 through line 21 for further recovery of the caloric potential as more fully hereinafter described. Thus a portion of the caloric potential of regasification of the LNG is utilized to provide the refrigeration requirements for demethanizer 16 wherein ethane and heavier constituents are separated from methane contained in the LNG.

Another portion of the LNG in line 13 is passed through line 22 through heat exchanger 23 to provide the refrigeration requirements for such exchange as more fully hereinafter described. LNG withdrawn from reflux condenser 15 through line 24 is combined with the LNG in line 25 withdrawn from heat exchanger 23. Depending on a momentary gas demand of high magnitude in the distribution system, a portion of the LNG in line 13 may by-pass condenser 15 and heat exchanger 16, and is passed through line 26.

The combined stream of LNG in line 25 is thereafter combined in line 27 with any LNG in line 26. The LNG in line 27 is thereafter passed through lines 28 and 29 to heat exchangers 30 and 31, and heat exchangers 32 and 33, respectively, wherein the LNG is vaporized. The operation of heat exchanger 30 will be described in greater detail hereinafter with reference to the ethylene process flow scheme illustrated in FIG. 2, however, it is understood that any such reference includes heat exchanger 31. Approximately 90% of the LNG is vaporized during passage through the exchangers 30 to 33. It is to be understood that heat exchangers 30 to 33 are schematically illustrated and that each heat exchanger may represent one or more heat exchangers in an actual plant. The LNG must be vaporized to an appropriate level, however, it is desirable to not completely vaporize the LNG in heat exchangers 30 to 33, since complete vaporization of the LNG would make the separation of methane from the ethane and heavier constituents in demethanizer 16 more difficult. Since momentary demands of LNG may vary, the LNG may be solely vaporized in heat exchangers 30 and 31, however, to insure vaporization to the proper level, heat exchangers 32 and 33 are provided wherein the LNG is passed in heat exchange relation with a heat transfer medium.

The now vaporized natural gas is withdrawn from heat exchangers 30 to 33 through lines 34 and 35 and introduced into demethanizer 16 through line 36 for separation of methane from ethane and other heavier constituents contained in the natural gas. The natural gas in line 36 is at a pressure of about 335 p.s.i.a. and at a temperature of about −149° F. The demethanizer 16 is operated at a pressure of about 330 to about 335 p.s.i.a., and at a bottom temperature of about 15° F. and an overhead temperature of about −155° F. The demethanizer overhead in line 17 from demethanizer 16 primarily comprised of methane is passed to reflux condenser 15, as hereinbefore described, and thereafter introduced into separator 19 wherein a portion of the overhead is condensed. The condensed portion is returned to the demethanizer 16 to provide the reflux requirements therefor.

The overhead from the separator 19 in line 21 is split and passed through lines 38 and 39, through heat exchangers 40 and 41, respectively, wherein methane is superheated to the temperature of the distribution system. The function of heat exchanger 40 will be more fully described with reference to the ethylene plant of FIG. 2. Heat exchanger 41 is provided in the event that the methane is not superheated to the temperature of the distribution system during passage through heat exchanger 40. The saturated vapors withdrawn from separator 19 are at a temperature of −155° F., and at a pressure of 330 p.s.i.a. are superheated to a temperature of 60° F. during passage through heat exchangers 40 and 41. The superheated natural gas is withdrawn from heat exchangers 40 and 41 through lines 42 and 43, and is passed through line 44 to metering station, generally indicated as 45, from which the gas is introduced into the gas distribution system through line 46.

The demethanizer bottoms primarily comprised of ethane and heavier constituents are withdrawn from demethanizer 16 through line 47 and passed through heat exchanger 48 to surge tank 49. From surge tank 49 the ethane and heavier constituents are withdrawn through line 50, vaporized in heat exchanger 51 and introduced into ethane cracking heaters, generally indicated as 52 and 53. Depending on the capacity of the ethylene plant and the amount of ethane and heavier constituents in the LNG, additional feed may be introduced through line 54 into the pyrolysis heaters 52 and 53. Under certain conditions, all of the feed to pyrolysis heaters 52 and 53 may be supplied through line 54. Such conditions would exist where the LNG contains only slight amounts of ethane and heavier hydrocarbons. Further, under such conditions, it would not be necessary to operate demethanizer 16, and consequently all of the LNG in line 13 is passed through lines 22 and 26 to recover the caloric potential of the LNG. A pyrolysis gas primarily comprised of hydrogen, ethylene, propylene and other valuable constituents are withdrawn from heaters 52 and 53 through line 55 and passed to an ethylene separation and purification system.

If it were assumed that the maximum daily vaporization rate were equal to 140 percent of the average hourly rate shown in Table 2, than the recovery of 90% of the ethane and all heavier constituents from the LNG in the demethanizer 16 maintained at 330 p.s.i.a. (with 90% of the feed vaporized), would require a temperature of approximately −153° F. at the top of the demethanizer, and a dissipation to the coolant of approximately 4.4 million B.t.u./hr. over reflux condenser 15. From Table 1 it will be noted that 12.0 million B.t.u./hr. of refrigeration will be available from the LNG side in this temperature range at an hourly average vaporization rate. The necessary amount of refrigeration will be supplied to condenser 15 through line 14. If desirable from the point of view of simplifying operations this amount of refrigeration can be kept constant. The recovery of ethane will then increase above the 90% minimum figure during periods that the LNG revaporization rate (send-out rate) is below the maximum that is to say for the greater part of the day. It will be understood to those skilled in the art that, given a constant reflux, the amount of heating medium supplied to demethanizer reboiler must be varied, which can be done by a controller (not shown) monitored by the composition at a suitable point in the demethanizer 16. It is necessary to recover as much of the ethane as possible irrespective of the composition of the LNG and the gas demand.

As will be further demonstrated below, refrigeration will also be available in abundance to supply the needs of the ethylene plant. The temperature levels at which this refrigeration is available are also lower than are generally used in the design of ethylene plants. It is thus possible to limit the maximum pressure at which the ethylene purification plant operates to below 150 p.s.i.a., and thus to save on installation and operating costs in effluent gas compression within the ethylene plant. The demethanizer of the ethylene plant must in these circumstances be supplied with refrigerant of the temperature range under (A), of Table 1. The amount of refrigeration to the demethanizer of an ethylene plant of the capacity indicated above will be in the order of 1.0 million B.t.u./hr., which will be supplied by heat exchanger 23 as more fully hereinafter described.

It will be understood from the above that the load on the demethanizer 16 changes as the demand for gas changes during the day and that it is possible by the incorporation of simple controls to have the demethanizer satisfactorily perform its task which is to separate in excess of 90% of the ethane and all of the heavier constituents contained in the LNG.

The flow rates of the LNG in lines 14 and 22 providing refrigerant for reflux condenser 15 and heat exchanger 23, respectively, are preferably constant, but are adjustable depending on seasonal conditions. It will be understood from the foregoing that the temperature of the LNG in line 27 will still be well below its boiling point and that it will be the further removed from its boiling point the more the momentary regasification rate exceeds the minimum demand rate.

As more fully hereinafter described heat exchangers 30 and 31 schematically represent the condensers in the ethylene plant of FIG. 2 where refrigeration is necessary and where a part of the caloric potential of the LNG will further be profitably employed. As hereinbefore stated, there may be a considerable number of such condensers, and reference to condenser 30 includes condenser 31. It is immaterial that some of such condensers may operate at temperature levels above that available across heat exchangers 30 and 31, and that it may be profitable for reasons understood by those skilled in the art to interpose a heat transfer medium between such exchangers 30 and 31.

A well designed ethylene plant of the capacity stated above in Table 3 will require the removal of in the order of 14.0 million B.t.u./hr. Of this amount some 60% constitute heat to be removed with the range of an ethylene refrigerant i.e. at levels above −150° F. and up to about −40° F., and 40% represent heat removed at and above −40° F. The total of 14.0 million B.t.u./hr. equals only one half of the refrigeration potential available at the temperature levels shown under Items (B) and (C) in Table 1 above, from the regasification of the LNG at an average hourly rate. In view of the surplus of refrigeration remaining available in the range specified under line (A) of Table 1 after deducting for the refrigeration duties to demethanizer 16 and to the heat exchanger 23, it will be seen that the minimum regasification rate could be less than one-half of the average without in any way starving the ethylene plant of refrigeration.

Few gas distribution systems show a daily load variation such that the minimum send-out rate equals only one half of the daily average rate. The ratio of maximum to minimum send-out depends on the season and particularly on the type of service, whether industrial or residential, supplied by the system. A distribution system wholly or to a substantial extent depending on imported LNG would invariably be supplying a considerable industrial load to even out seasonal fluctuations. For such a system the daily maximum send-out rate will more nearly be 115 to 120% and the daily minimum 75% of the daily average.

The ethylene plant illustrated in FIG. 2, will produce an off-gas stream rich in hydrogen. When using ethane as charge stock this stream will contain well over 80 vol. percent hydrogen, the diluent being methane and small amounts of CO. The hydrogen content as well as the hydrogen volume will be lower when other charge stock are used, but through proper design a stream containing at least 70 vol. percent hydrogen may be withdrawn from the ethylene plant.

Referring to FIG. 2 illustrating a schematic flow diagram of an ethylene separation and purification system, the feed to the heaters 52 and 53, as hereinbefore stated, may include a hydrocarbon from an outside source, such as for example, ethane in line 55, as well as recycle ethane in line 56 from the ethylene separation and purification system. The pyrolysis gas in line 54 is quenched in vessel 57 and passed through line 58 to compressor 59 wherein the pressure of the gas is raised to 150 p.s.i.g. or more. A gas containing ethylene from another source in line 60 may also be processed in the ethylene plant. From compressor 59 the pyrolysis gas in line 61 is treated in a conventional manner to remove carbon dioxide and hydrogen sulfide, generally indicated as 62, and passed through line 63 to driers, generally indicated as 64, to remove water. From driers 64, the gas is passed through line 64 through heat exchangers 66 and 40, and thence through line 67 into de-ethanizer 68. In heat exchanger 40, the pyrolysis gas is cooled by superheating the natural gas passing in indirect heat exchanger therewith. In de-ethanizer 68, the $C_2$ and lighter hydrocarbons are separated from $C_3$ and heavier constituents. The $C_2$ and lighter hydrocarbons are withdrawn as overhead in line 69, while $C_3$ and the heavier constituents are withdrawn as de-ethanizer bottoms in line 70. De-ethanizer 68 includes reflux condenser 30 and reboiler 71, and is operated at a pressure of about 130 p.s.i.g. or more. The de-ethanizer overhead in line 69 is cooled in reflux condenser 30 and is introduced into separator 73 through line 72. The condensed portion is withdrawn from separator 73 through line 74 by pump 75 and is passed through line 76 to de-ethanizer 68 to provide the reflux requirements therefor. Thus, a portion of the caloric potential of the LNG, provides the cold for condenser 30 which in FIG. 1 operates to vaporize the LNG prior to introduction into demethanizer 16.

A gaseous stream primarily comprised of hydrogen, methane, ethylene and unreacted ethane is withdrawn from separator 73 through line 78 and is passed through a low temperature gas-chilling train including heat exchangers 30 and 23 and introduced through line 79 into demethanizer 80. During passage of such gaseous streams through the aforementioned low temperature gas-chilling train, the gaseous stream is cooled to approximately −130° F. whereby approximately 95% of the $C_2$ hydrocarbons are liquefied together with a portion of the methane.

Demethanizer 80 includes reflux condenser 23 and reboiler 81 and operates at a pressure of about 120 p.s.i.g. or more. The overhead from demethanizer 80 is withdrawn through line 82 and passed through reflux condenser 23 and introduced through line 83 into separator 84. In separator 84, a portion of the overhead is condensed and returned through lines 85 to demethanizer 80 to provide the reflux requirements therefor. Thus the refrigeration requirements for operating demethanizer 80 are provided by heat exchangers 23 and 30, and condenser 23. The gaseous overhead primarily comprised of methane and hydrogen and other non-condensible gases from separator 84 is withdrawn through line 86, and introduced into a carbon monoxide column 87 including condenser 23 and reboiler 88. In carbon dioxide column 87, hydrogen and minor amounts of carbon monoxide are withdrawn through line 89. The gaseous stream in line 89 may be further treated to remove substantially all of the carbon monoxide to recover hydrogen of high purity, i.e., having less than 0.5% carbon monoxide, such as by refluxing the carbon monoxide column with carbon monoxide and methane condensed by the sensible heat of the LNG stream.

The reflux requirements for carbon monoxide column 87 are provided by withdrawing through line 90 a gaseous stream and passing such stream through condenser 23 and thence through line 91. The bottoms in line 92 from tower 87 primarily comprised of carbon monoxide and methane are utilized as fuel.

The bottoms from demethanizer 80 are withdrawn through line 93 and introduced into ethylene fractionator 94 wherein ethane is separated from ethylene. A gaseous overhead from ethylene fractionator 94 is withdrawn through line 95 and passed through reflux condenser 30, and into separator 96 through line 97. From separator 96 a condensed portion is withdrawn through line 98 to satisfy the reflux requirements for ethylene fractionator 94. Product ethylene is withdrawn from separator 96 through line 98. The bottoms from ethylene fractionator 94 primarily comprised of ethane are withdrawn through line 99 and passed through a heat exchanger 100 and constitute a portion of the feed introduced into the pyrolysis heaters 52 and 53.

A portion of the bottoms from the de-ethanizer 50 primarily comprised of $C_3$ and heavier hydrocarbons in line 70 are introduced into a depropanizer 101 to separate propane and propylene from the heavier hydrocarbons. Depropanizer 101 includes a reflux condenser 102 and a reheater 103. Propane and propylene are withdrawn from depropanizer 101 as overhead through line 104 and passed through reflux condenser 102 and line 105 into surge tank 106. The condensed fraction primarily comprised of propane is withdrawn from surge tank 106 through line 107 and a portion thereof is passed by pump 108 through line 109 and introduced into depropanizer 101 to satisfy the reflux requirements for the tower. The remaining portion of the $C_3$ hydrocarbons is withdrawn from the plant through line 110. A gaseous stream primarily comprised of propylene is withdrawn from separator 160 through line 111. $C_4$ and heavier hydrocarbons are withdrawn as bottoms from depropanizer 101 through line 112.

As is readily apparent from the foregoing description, the refrigeration requirements for demethanizer 16, de-ethanizer 68, demethanizer 80, ethylene fractionator 94, and carbon monoxide column 87 are furnished by the caloric potential of the LNG during regasification. Sufficient refrigeration is available for the ethylene fractionator 94 to operate at approximately −140° F. where the LNG heat exchanger (or vaporizer) 30 contains refrigerant at approximately −170° F.

The refrigeration requirements to effect the separation of methane from ethane and heavier constituents in the LNG, and the refrigeration requirements to effect the separation and purification of the ethylene from a pyrolysis gas obtained by cracking of the ethane and heavier constituents is thus provided by regasification of LNG. As hereinbefore indicated, it is necessary to only utilize a portion of the caloric potential of regasification of LNG to effect such separation when regasifying LNG containing the usual amounts of ethane and that the ethane content of the natural gas is essentially the only limiting factor of my invention.

It is to be understood that other ethylene separation and purification schemes may be employed to utilize the available caloric potential of regasification of the LNG and that other processing plants can utilize the caloric potential of regasification of the LNG.

While I have shown and described a preferred form of my invention, I am aware that variations may be made thereto, and I, therefore, desire a broad interpretation of my invention within the scope of the disclosure herein and the following claims.

What is claimed is:

1. A process for regasifying liquefied natural gas while separating out the components of a mixture containing $C_1$–$C_4$ hydrocarbons, comprising:
   (a) introducing the mixture into a deethanizer to recover a $C_{1-2}$ overhead and a $C_{1-3}$ bottoms;
   (b) introducing the $C_{1-2}$ overhead into a demethanizer to recover an ethane-ethylene bottoms and a methane containing overhead;
   (c) introducing the ethane-ethylene bottoms into an ethane-ethylene splitter to recover an ethylene overhead; and
   (d) passing the liquefied natural gas in heat exchange with the overhead of the deethanizer, demethanizer and splitter to effect vaporization thereof.

2. A process for producing ethylene and regasifying a liquefied natural gas to utilize the caloric potential thereof, the steps comprising:
   (a) introducing vaporized natural gas into a de-methanization zone;
   (b) separating said vaporized natural gas in said de-methanization zone into a gaseous overhead stream containing the methane and lighter constituents and a liquid bottoms stream containing the $C_2$ and heavier constituents;
   (c) cracking said liquid bottoms stream to produce a product stream containing a substantial amount of ethylene and in addition, methane, unreacted ethane, hydrogen, $C_3$ and heavier hydrocarbons;
   (d) introducing the product-stream into a deethanizer to recover a $C_{1-2}$ and hydrogen overhead and a $C_3$ and heavier hydrocarbon bottoms;
   (e) introducing the $C_{1-2}$ and hydrogen overhead into a demethanizer to recover an ethane-ethylene bottoms and methane and hydrogen containing overhead;
   (f) introducing the ethane-ethylene bottoms into an ethane and ethylene splitter to recover an ethylene overhead;
   (g) passing liquefied natural gas in heat exchange with the overhead of the deethanizer, demethanizer and splitter to effect regasification of said liquefied natural gas; and
   (h) employing regasified natural gas produced in step (g) in step (a).

3. A process for producing ethylene and regasifying a liquified natural gas to utilize the caloric potential thereof, the steps comprising:
   (a) introducing said vaporized natural gas into a de-methanization zone;
   (b) separating said vaporized natural gas in said de-methanization zone into a gaseous overhead stream containing the methane and lighter constituents and a liquid bottoms stream containing the $C_2$ and heavier constituents;
   (c) passing said gaseous overhead stream in heat-exchange relationship with at least a portion of said liquefied natural gas to condense a portion of the overhead to provide reflux requirements for said de-methanization zone;
   (d) removing the uncondensed overhead stream as a product of the system;
   (e) cracking said liquid bottoms stream to produce a product stream containing a substantial amount of ethylene and in addition, methane, unreacted ethane, hydrogen and $C_3$ and heavier hydrocarbons;
   (f) introducing the product stream into a deethanizer to recover a $C_{1-2}$ and hydrogen overhead and a $C_3$ and heavier hydrocarbons bottoms;
   (g) introducing the $C_{1-2}$ and hydrogen overhead into a demethanizer to recover an ethane-ethylene bottoms and methane and hydrogen containing overhead;
   (h) introducing the ethane-ethylene bottoms into an ethane-ethylene splitter to recover an ethylene overhead;
   (i) passing liquefied natural gas in heat exchange with the overhead of the deethanizer, demethanizer and splitter to effect regasification of said liquefied natural gas; and
   (j) employing regasified natural gas produced in step (i) in step (a).

4. The process as defined in claim 3 wherein a mixture of liquefied and vaporized natural gas is introduced into the demethanization zone employed in step (a).

References Cited

UNITED STATES PATENTS

| | | | |
|---|---|---|---|
| 2,471,602 | 5/1949 | Arnold | 62—26 |
| 2,600,110 | 6/1952 | Hachmuth | 62—26 |
| 2,777,305 | 1/1957 | Davison | 62—28 |
| 2,952,984 | 9/1960 | Marshall | 62—27 |
| 3,034,307 | 5/1962 | Berger | 62—24 |
| 3,055,183 | 9/1962 | Kniel | 62—24 |
| 3,095,293 | 6/1963 | Kuerston | 62—23 |
| 3,119,677 | 1/1964 | Moon et al. | 62—23 |
| 3,261,169 | 7/1966 | Harmens | 62—28 |
| 2,498,806 | 2/1950 | Hachmuth | 62—26 |
| 2,952,984 | 9/1960 | Marshall | 62—27 |
| 2,672,489 | 3/1954 | Holland | 260—83 |

NORMAN YUDKOFF, Primary Examiner

U.S. Cl. X.R.

62—28, 40